United States Patent [19]

Noll et al.

[11] 4,192,937

[45] Mar. 11, 1980

[54] PROCESS FOR THE PREPARATION OF ISOCYANATE POLYADDITION PRODUCTS WHICH HAVE HYDROXYL GROUPS IN SIDE CHAINS

[75] Inventors: Klaus Noll, Cologne; Klaus Nachtkamp, Bergisch-Gladbach; Josef Pedain, Cologne, all of Fed. Rep. of Germany

[73] Assignee: Bayer Aktiengesellschaft, Leverkusen, Fed. Rep. of Germany

[21] Appl. No.: 921,285

[22] Filed: Jul. 3, 1978

[30] Foreign Application Priority Data

Jul. 15, 1977 [DE] Fed. Rep. of Germany ....... 2732131

[51] Int. Cl.$^2$ ..................... C08G 18/10; C08G 18/38; C08L 75/12
[52] U.S. Cl. .............. 528/59; 260/29.2 TN; 528/73; 528/904; 528/71
[58] Field of Search .......................... 528/59, 73, 904; 260/29.2 TN

[56] References Cited

U.S. PATENT DOCUMENTS

| | | | |
|---|---|---|---|
| 3,533,983 | 10/1970 | Hirosawa | 528/59 |
| 3,694,401 | 9/1972 | Gaertner | 528/59 |
| 3,702,839 | 11/1972 | Glasgow | 528/59 |
| 3,743,626 | 7/1973 | Emmons | 528/73 |
| 3,763,070 | 10/1973 | Shearing | 260/29.2 TN |
| 3,817,938 | 6/1974 | Ashida et al. | 528/59 |
| 4,118,373 | 10/1978 | Orvik | 528/73 |
| 4,118,376 | 10/1978 | Pedain et al. | 528/59 |

*Primary Examiner*—H. S. Cockeram
*Attorney, Agent, or Firm*—Gene Harsh; Lawrence S. Pope

[57] ABSTRACT

The present invention relates to a process for the preparation of substantially linear isocyanate polyaddition products having side-chain hydroxyl groups by the reaction of reactive systems which contain free isocyanate groups and oxazolidine groups with water, characterized in that (a) substantially linear prepolymers which contain both isocyanate groups and oxazolidine groups in end positions or (b) a mixture containing substantially linear isocyanate prepolymers and bis-oxazolidines are chain lengthened by mixing with water, using a quantity of water calculated to provide at least about 1 mol of water per mol of oxazolidine groups present in the reaction mixture. The present invention also relates in particular to an embodiment of this process in which the prepolymers used contain chemically built-in hydrophilic groups and/or external emulsifiers, and water is used in such excess that the reaction leads directly to aqueous dispersions or solutions of the polyaddition products. Lastly, the present invention also relates to isocyanate polyaddition products obtainable by the process according to the invention.

10 Claims, No Drawings

PROCESS FOR THE PREPARATION OF ISOCYANATE POLYADDITION PRODUCTS WHICH HAVE HYDROXYL GROUPS IN SIDE CHAINS

FIELD OF THE INVENTION

This invention relates to a process for the preparation of isocyanate polyaddition products which have hydroxyl groups in side chains, and to the compounds which can be obtained by this process.

BACKGROUND OF THE INVENTION

The process according to the invention is based on the principle of reacting reactive systems which contain isocyanate groups and oxazolidine groups with water so that the chain lengthening reaction is accompanied mainly by the formation of urea groups from the isocyanate groups and from the amino groups which are liberated from the oxazolidines hydrolytically, while the comparatively inert hydroxyl groups which are also liberated from the oxazolidine groups by hydrolytic splitting do not take part in the reaction but are left in side chains in the products of the process.

The principle of cross-linking reactive systems which contain isocyanate groups and oxazolidine groups by the effect of moisture has already been disclosed in numerous publications, for example German Offenlegungsschriften Nos. 1,952,091; 1,952,092; 2,018,233; 2,446,438 and 2,458,588 and U.S. Patent Nos. 3,661,923; 3,743,626; 3,864,335 and 4,002,601. The compositions described in these publications are generally systems containing oxazolidines and isocyanates which are stable in storage in the absence of moisture and which react under the influence of atmospheric moisture, i.e. in the presence of traces of water, to form high molecular weight cross-linked structures. Due to the slow access of water in the form of atmospheric moisture, both the amino groups and the hydroxyl groups of the hydrolytically split oxazolidine react with the isocyanate groups. The polyisocyanate component, therefore, undergoes not so much chain lengthening reactions but rather true cross-linking reactions to give rise to products in which there are virtually no more hydroxyl groups in side-chains. No indications of the process according to the invention described below can be found in the aforesaid publications.

SUMMARY OF THE INVENTION

The present invention relates to a process for the preparation of substantially linear isocyanate polyaddition products having side-chain hydroxyl groups by the reaction of reactive systems which contain free isocyanate groups and oxazolidine groups with water, characterized in that (a) substantially linear prepolymers which contain both isocyanate groups and oxazolidine groups in end positions or (b) a mixture containing substantially linear isocyanate prepolymers and bis-oxazolidines are chain lengthened by mixing with water, using a quantity of water calculated to provide at least about 1 mol of water per mol of oxazolidine groups present in the reaction mixture.

The present invention also relates in particular to an embodiment of this process in which the prepolymers used contain chemically built-in hydrophilic groups and/or external emulsifiers, and water is used in such excess that the reaction leads directly to aqueous dispersions or solutions of the polyaddition products.

Lastly, the present invention also relates to isocyanate polyaddition products obtainable by the process according to the invention.

DETAILED DESCRIPTION OF THE INVENTION

The process according to the invention makes it possible for the first time deliberately to produce polyurethanes which are predominantly linear and, therefore, soluble in the usual solvents and which contain hydroxyl groups in side-chains and are, therefore capable, of undergoing a subsequent cross-linking reaction, for example with organic polyisocyanates. Since the products obtained by the process according to the invention have a linear structure, they can easily be converted into aqueous dispersions or solutions if they also contain hydrophilic groups and/or if external emulsifiers are used, and these dispersions or solutions can then easily be used for the manufacture of cross-linkable sheet products.

The starting materials used for the process according to the invention comprise substantially linear prepolymers, generally with an average molecular weight of from about 500 to 10,000, preferably from about 800 to 4000, which contain, on statistical average, from about 1.8 to 2.2, preferably 2, isocyanate end groups.

The isocyanate prepolymers are prepared by known methods of polyurethane chemistry by reacting excess quantities of organic polyisocyanates, preferably diisocyanates, with suitable, preferably difunctional compounds which have isocyanate reactive groups. The starting materials for preparing the isocyanate prepolymers thus include the following compounds:

1. Any organic polyisocyanates, preferably diisocyanates represented by the following formula:

in which Q represents an aliphatic hydrocarbon group having from 4 to 12 carbon atoms, a cycloaliphatic hydrocarbon group having from 6 to 15 carbon atoms, an aromatic hydrocarbon group having from 6 to 15 carbon atoms or an araliphatic hydrocarbon group having from 7 to 15 carbon atoms. Examples of these preferred diisocyanates include tetramethylene diisocyanate; hexamethylene diisocyanate; dodecamethylene diisocyanate; 1,4-diisocyanatocyclohexane; 1-isocyanato-3,3,5-trimethyl-5-isocyanatomethylcyclohexane; 4,4'-diisocyanatodicyclohexyl methane; 4,4'-diisocyanato-dicyclohexyl propane-(2,2); 1,4-diisocyanatobenzene; 2,4-diisocyanatotoluene; 2,6-diisocyanatotoluene; 4,4'-diisocyanato diphenylmethane; 4,4'-diisocyanatodiphenylpropane-(2,2); p-xylylenediisocyanate; α,α,α',α'-ytetramethyl-m- or p-xylylenediisocyanate and mixtures of the above compounds.

The higher functional polyisocyanates known in polyurethane chemistry as well as the known modified polyisocyanates, such as polyisocyanates containing carbodiimide groups, allophanate groups, isocyanurate groups, urethane groups and/or biuret groups may, of course, also be used, as either part or all of the polyisocyanate component.

2. Any organic compounds having at least two isocyanate-reactive groups, in particular organic compounds with molecular weights of from about 62 to 10,000, preferably from about 1,000 to 6,000, containing a total of two amino groups, thiol groups, carboxyl groups and/or hydroxyl groups. It is preferred to use the dihydroxy compounds of this kind. A small porportion of compounds which are trifunctional or higher-functional in the isocyanate polyaddition reaction may be used in order to obtain a certain degree of branching, and trifunctional or higher-functional polyisocyanates may also be used for the same purpose.

The hydroxyl compounds used are preferably the known hydroxypolyesters, hydroxypolyethers, hydroxypolythioethers, hydroxypolyacetals, hydroxypolycarbonates and/or hydroxypolyester amides used in polyurethane chemistry.

Suitable polyesters with hydroxyl groups include e.g. reaction products of polyvalent, preferably divalent alcohols, to which trivalent alcohols may be added, and polyvalent, preferably divalent, carboxylic acids. Instead of free polycarboxylic acids, the corresponding polycarboxylic acid anhydrides or corresponding polycarboxylic acid esters of lower alcohols or mixtures thereof may, of course, be used for preparing the polyesters.

The polycarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and terephthalic acid-bis-glycol esters.

The following are examples of suitable polyvalent alcohols: ethylene glycol, propylene glycol-(1,2) and -(1,3), butylene glycol-(1,4) and -(2,3), hexanediol-(1,6), octanediol -(1,8), neopentylglycol, cyclohexanedimethanol-(1,4-bishydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols.

The polyesters may also contain a proportion of carboxyl end groups. Polyesters of lactones such as ε-caprolactone or hydroxycarboxylic acids such as ω-hydroxycaproic acid may also be used.

The polyethers used according to the invention which have preferably two hydroxyl groups are also known per se and are prepared, for example, by polymerization of epoxides such as ethylene oxide, propylene oxide, butylene oxide, tetrahydrofuran, styrene oxide or epichlorohydrin, either each on its own, e.g. in the presence of boron trifluoride, or by addition of these epoxides, either as mixtures or successively, to starting components having reactive hydrogen atoms, such as alcohols or amines, e.g. water, ethylene glycol, propylene glycol-(1,3) or - (1,2), 4,4'-dihydroxy-diphenylpropane or aniline. Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536 are also suitable. The higher functional polyethers of which a certain proportion may also be included are obtained in a similar manner by the known process of alkoxylation of higher functional starter molecules such as ammonia, ethanolamine, ethylene diamine or sucrose.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example those which can be prepared by the reaction of diols such as propanediol-(1,3), butanediol-(1,4) and/or hexanediol-(1,6), diethylene glycol, triethylene glycol or tetraethylene glycol with diarylcarbonates, e.g. with diphenylcarbonate or phosgene. Suitable methods and processes are described in the text, Chemistry and Physics of Polycarbonates, by Hermann Schnell, Interscience Publishers, 1964.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof. Polyhydroxyl compounds already containing urethane or urea groups may also be used.

Low molecular weight polyols may also be used as part or all of the polyhydroxyl component. Examples of such polyols include ethanediol, propanediol-(1,2) and-(1,3), butanediol-(1,4) and -(1,3), pentanediols, hexanediols, trimethylolpropane, hexanetriols, glycerol and pentaerythritol.

Representatives of the above-mentioned polyisocyanate and hydroxyl compounds used in the process according to the invention have been described, for example, in High Polymers, Vol. XVI, "Polyurethanes, Chemistry and Technology" by Saunders-Frisch, Interscience Publishers, New York, London, Volume I, 1962, pages 32 to 42 and 44 to 54, and Volume II, 1964, pages 5 to 6 and 198 to 199, and in Kunststoff-Handbuch, Volume VII, Vieweg-Hochtlen, Carl-Hanser-Verlag, Munich, 1966, e.g. on pages 45 to 71.

If, according to the special embodiment mentioned above, hydrophilically modified prepolymers are to be used in the process according to the invention, they are prepared by processes known in the art, for example the methods described in German Offenlegungsschrift Nos. 1,495,745; 1,495,847; 2,446,440 and 2,340,512; U.S. Pat. No. 3,479,310 and allowed U.S. application Ser. No. 777,206, filed Mar. 14, 1977, both incorporated herein by reference, and British Pat. Nos. 1,158,088 and 1,076,688. This means that, in addition to the starting materials already mentioned above as examples for the preparation of prepolymers, there are used starting components which contain chemically fixed hydrophilic groups and are preferably monofunctional and even more preferably difunctional in the isocyanate addition reaction, such as the starting components which are given as examples in the above-noted publications and patents for the preparation of aqueous polyurethane dispersions or solutions; that is to say, for example, dihydroxy compounds, diamines or diisocyanates containing ionic or potentially ionic groups or glycols or diisocyanates containing polyethylene oxide units.

The preferred, hydrophilically modified starting components include in particular aliphatic diols containing sulphanate groups according to German Offenlegungsschrift No. 2,446,440 which corresponds to allowed U.S. application Ser. No. 777,206 filed Mar. 14, 1977, cationic or anionic internal emulsifiers which can be built into the molecule according to German Patent Application No. P 26 51 506.0 which corresponds to U.S. application Ser. No. 849,690, filed Nov. 8, 1977, and monofunctional polyethers capable of being built into the molecule, which have also been described in German Patent Application No. P 26 51 506.0 which corresponds to U.S. application Ser. No. 849,690 filed Nov. 8, 1977.

When preparing isocyanate prepolymers according to principles known in the art, the reactants are generally used in proportions corresponding to a ratio of isocyanate groups to isocyanate reactive hydrogen atoms, preferably in the form of hydroxyl groups, of from about 1.05 to 10, preferably about 1.1 to 3.

The sequence in which the individual reactants are put into the process is largely immaterial. The hydroxyl compound may first be mixed and the polyisocyanate then added or the mixture of hydroxyl compounds may be added to the polyisocyanate component or the individual hydroxyl compounds may be added successively to the polyisocyanate component.

The isocyanate prepolymers are preferably prepared solvent-free at about 30° to 190° C., preferably at 50° to 120° C., although they may, of course, also be prepared in the presence of organic solvents.

Suitable solvents, which may be used, for example, in a quantity of up to about 25% by weight, based on the solids content, would be, for example, acetone, methylethyl ketone, ethyl acetate, dimethylformamide and cyclohexanone.

The nature and proportions of the starting materials used for the preparation of the isocyanate prepolymers are otherwise preferably chosen so that the isocyanate prepolymers (a) have an average isocyanate functionality of from about 1.8 to 2.2, preferably about 2
(b) contain cationic or anionic groups built into the molecule in quantities of from about 0 to 100, preferably from about 0.1 to 100, and in particular from about 0.5 to 50 milliequivalents per 100 g of solids content,
(c) contain from about 0 to 30%, preferably from about 0.5 to 30% and particularly from about 1 to 20% by weight, based on the total weight of the prepolymer, of ethylene oxide units within a polyether segment, which units are built into the molecule in side-chains or in end positions and/or within the main chain, and,
(d) have an average molecular weight of from about 500 to 10,000, preferably from about 800 to 4,000.

The preferred isocyanate prepolymers include, as already explained above, those which contain either ionic groups of the type mentioned under (b), i.e. in particular $-COO^-$, $-SO_3^-$ or $=N^+=$, or non-ionic groups of the type mentioned under (c) or both ionic and non-ionic groups of the type mentioned. On the other hand, isocyanate prepolymers which have been prepared without any of the hydrophilic starting materials mentioned and in which the number of groups mentioned under (b) and (c) is, therefore, 0 may also be used for the process according to the invention.

When such isocyanate prepolymers are used, which otherwise also have the properties mentioned under (a) and (d), the preparation of aqueous dispersions or solutions from the end products when carrying out the process according to the invention is possible only if external emulsifiers are used. Suitable emulsifiers of this kind have been described, for example, by R. Heusch in "Emulsionen", Ullmann, Volume 10, pages 449 to 473, Weinheim, 1975. Both ionic emulsifiers such as alkali metal salts and ammonium salts of long chain fatty acids or long chain aryl (alkyl)sulphonic acids and non-ionic emulsifiers such as ethoxylated alkyl benzenes with an average molecular weight of from 500 to 10,000 are suitable.

These external emulsifiers are intimately mixed with the isocyanate prepolymers before the process according to the invention is carried out. They are generally used in quantities of from about 1 to 30% by weight, preferably from about 5 to 20% by weight, based on the weight of the isocyanate prepolymer. These external emulsifiers may also quite well be used with hydrophilically modified isocyanate prepolymers in order to increase their hydrophilic character, although this is generally not necessary.

As already explained above, the incorporation of hydrophilic groups or the use of external emulsifiers when carrying out the process according to the invention is not absolutely necessary and is generally only carried out when the products of the process according to the invention are required to be obtained in the form of aqueous dispersions or solutions. The process according to the invention could quite well be carried out in the solvents mentioned above as examples, in which case the products according to the invention are obtained as solutions in these solvents.

The isocyanate prepolymers mentioned above as examples, which have from about 1.8–2.2, preferably about 2, isocyanate end groups, and preferably used as mixtures with bis-oxazolidines in the process according to the invention. By "bis-oxazolidines" are meant any organic compounds which contain two oxazolidine groups which react to form a hydroxyl group and a secondary amino group under the influence of water but are otherwise inert under the conditions of the process according to the invention. Among the preferred bis-oxazolidines are those compounds which contain two groups represented by the following formula:

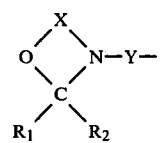

in which
R₁ and R₂ which may be the same or different, represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms, or $R_1$ and $R_2$ together with the ring carbon atom may form a 5-membered or 6-membered cycloaliphatic hydrocarbon ring, X represents a group represented by the following formula:

in which $R_3$ and $R_4$ which may be the same or different, represent hydrogen or $C_1$–$C_4$ alkyl groups or, preferably, hydrogen, and m represents 2 or 3, Y represents a group represented by the following formula:

in which $R_3$ and $R_4$ have the meanings already indicated and n represents an integer of from 2 to 6.

The particularly preferred bis-oxazolidines include those in which two groups of the above-mentioned formula are linked together through a divalent group of the formula

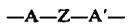

—A—Z—A'— in which
A and A' are the same or different and represent —COO— or —OCO—NH— and
Z represents a divalent aliphatic hydrocarbon group with from 2 to 14 carbon atoms, a divalent cycloaliphatic hydrocarbon group with from 5 to 14 carbon atoms or an arylene group with from 6 to 15 carbon atoms.

In the process according to the invention, there are used either mixtures of the isocyanate prepolymers mentioned above as examples with the bis-oxazolidines mentioned as examples or predominantly linear prepolymers containing isocyanate groups and oxazolidine groups.

The last mentioned prepolymers may easily be obtained by reacting the predominantly difunctional isocyanate prepolymers mentioned above as examples with oxazolidines which contain hydroxyl groups, as represented by the following formula:

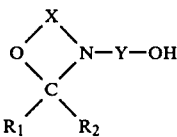

in which $R_1$, $R_2$, X and Y have the meanings already indicated.

When preparing these prepolymers which contain isocyanate groups and oxazolidines, the reactants are preferably used in such proportions that from about 0.37 to 0.53, preferably from about 0.4 to 0.51 mol of hydroxyl groups of the hydroxyoxazolidine are present for each mol of isocyanate groups of the isocyanate prepolymer. In this way, reaction mixtures are obtained which contain from about 0.6 to 1.1, preferably about 0.65–1.05 oxazolidine groups per remaining isocyanate group. Since the monohydroxy-oxazolidines are monofunctional compounds, increase in molecular size does not occur to any significant extent. The reaction products are, therefore, substantially linear compounds like the isocyanate prepolymers used as starting materials.

Both the hydroxy-oxazolidines and the above-mentioned bis-oxazolidines are compounds known in the literature and are described, for example, in the references mentioned above in connection with the moisture-hardening oxazolidine compositions known in the art. Particularly preferred bis-oxazolidines and hydroxy-oxazolidines are the compounds mentioned in U.S. Pat. No. 4,002,601, incorporated herein by reference, and in German Offenlegungsschrift No. 2,446,438.

N-hydroxyalkyl-oxazolidines are prepared by known methods in which a ketone or an aldehyde is condensed with a bis-(hydroxy-alkyl)-amine by a process of ring-closing dehydration and the water of reaction is removed in the usual manner by means of an inert carrier or by azeotropic distillation with the carbonyl compound which was used in excess.

The following aldehydes and ketones are particularly suitable carbonyl compounds of the formula:

Formaldehyde, acetaldehyde, propionaldehyde, butyraldehyde, isobutyraldehyde, benzaldehyde, tetrahydrobenzaldehyde, acetone, methylethyl ketone, methylpropyl ketone, methylisopropyl ketone, diethyl ketone, methylbutyl ketone, methylisobutyl ketone, methyl-t-butyl ketone, diisobutyl ketone, cyclopentanone and cyclohexanone. According to the definition given above of the preferred groups $R_1$ and $R_2$, the preferred carbonyl compounds are formaldehyde and the above-mentioned aldehydes and ketones.

Suitable bis-(hydroxyalkyl)-amines of the formula

HO—X—NH—Y—OH are, in particular, bis-(2-hydroxyethyl)-amine and bis-(2-hydroxypropyl)-amine but equally suitable in principle are, for example, bis-(2-hydroxybutyl)-amine, bis-(2-hydroxyhexyl)-amine, bis-(3-hydroxyhexyl)-amine and N-(2-hydroxypropyl)-N-(6-hydroxyl)-amine.

Starting from the hydroxy-oxazolidines described above, the bis-oxazolidines to be used according to the invention, which preferably have urethane groups, may be prepared by reaction with diisocyanates of the formula

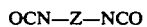

OCN—Z—NCO (in which Z has the meaning already mentioned above), e.g. hexamethylene diisocyanate, 3,3,5 trimethyl-5-isocyanatomethyl-cyclohexylisocyanate (IPDI), 4,4'-diisocyanatodicyclohexylmethane, 2,4- and 2,6-diisocyanatotoluene or 4,4'-diisocyanatodiphenylmethane. A reaction of the above described hydroxy-oxazolidines with aliphatic, cycloaliphatic or aromatic dicarboxylic acids of the following formula

HOOC—Z—COOH also leads to bis-oxazolidines with ester groups suitable for the process according to the invention.

Instead of using these dicarboxylic acids, their bis-chlorides may be used with elimination of hydrogen chloride or their bis-esters may be used with elimination of the alcohol. The hydroxyl group of the hydroxy-oxazolidines may also be reacted with stoichiometric quantities of hydroxycarboxylic acids or the corresponding lactones before these dimerization reactions are carried out. For this purpose there may be used, for example, hydroxypropionic acid, hydrobutyric acid, hydroxycaproic acid, etc. or their lactones. However, this additional modification is less preferred.

When carrying out the process according to the invention, (a) the prepolymers with oxazolidine and isocyanate groups mentioned above as examples or (b) mixtures of the isocyanate prepolymers mentioned above as examples and the bis-oxazolidines mentioned as examples, in which the components are generally used in such proportions that from about 0.6 to 1.1, preferably from about 0.65 to 1.05 mol of oxazolidine groups are present for each mol of isocyanate groups are mixed with water. The water is not used in the form of atmospheric moisture, as in the prior publications mentioned above, but in the liquid form. The important condition to be observed is that the quantity of water should be at least sufficient for hydrolysis of the oxazolidine groups, i.e. at least about 1 mol of water should be used per mol of oxazolidine groups. In general, however, at least a 100% excess above this quantity of water would be used even when the products of the process according to the invention are not required to be prepared as aqueous dispersions or solutions but, for example, as solutions in organic solvents. By using water in the liquid form and using the quantity of water mentioned above, the possibility of an addition reaction between the isocyanate groups and the hydroxyl groups which are formed hydrolytically from the oxazolidine groups is to a large extent eliminated since, even when the quantity of oxazolidine used is less than equivalent to the isocyanate groups, a chain-lengthening reaction between the isocyanate groups and the water which is present in excess will always take place in preferance to an addition reaction between isocyanate groups and hydroxyl groups. When aqueous solutions or dispersions are to be prepared in the process according to the invention, water is generally used in quantities of from about 40 to 900% by weight, preferably from 55 to 230% by weight, based on the quantity of reactive system which contains oxazolidine and isocyanate groups.

When solutions of the products according to the invention in organic solvents are to be prepared, the following procedure is generally adopted for carrying out the process according to the invention:

The reaction mixture containing the isocyanate groups and oxazolidine groups is dissolved in a suitable solvent, preferably one which is miscible with water, to form an about 5 to 95% by weight, preferably an about 20 to 70% by weight, solution. Water or a mixture of water and a water-miscible solvent is then added to this solution with stirring. At this stage, the temperature should generally be between about 0° and 80° C. In that case, a solution of the product of the process in the solvent or solvent/water mixture is immediately formed. Suitable solvents are, for example, dimethylformamide, dimethylsulphoxide, acetone, methylethyl ketone or mixtures of, for example, tertiary alcohols such as tertiary butanol with aromatic solvents such as toluene.

In the particularly preferred embodiment of the process according to the invention, in which aqueous dispersions or solutions of the products according to the invention are prepared at the same time, the reactive system, which has either been hydrophilically modified as described above or contains an external emulsifier, is either directly stirred up with water, especially if it is a liquid, or an auxiliary solvent is used on the principles already outlined above. The auxiliary solvent used is a suitable water-miscible solvent having a boiling point below about 100° C. so that it can be removed by distillation after the reaction according to the invention. When aqueous dispersions or solutions are prepared by this method, dispersion or dissolving of the prepolymer and its chain lengthening occur virtually simultaneously. One decisive advantage over the processes known in the art for the solvent-free or low solvent preparation of aqueous polyurethane dispersions is that intimate mixing with the chain lengthening agent takes place before the prepolymer is brought together with water, and that chemical fixing of the chain lengthening group (oxazolidine group) already takes place before the prepolymer is mixed with water, with the result that chain lengthening results in exceptionally homogeneous products. The process according to the invention is particularly suitable for the preparation of aqueous dispersions or solutions with a solids content of from about 10 to 70% by weight, preferably from about 30 to 65% by weight.

The particles of the discontinuous phase in the dispersions generally have a diameter of from about 50 to 1000 nm. Sols in which the particles of the discontinuous phase have a diameter of about 1 to 50 nm or clear, aqueous solutions in which the solid constituent is in a molecular disperse form or at the most in the form of associations may also be prepared according to the invention.

Whether the process according to the invention results in solutions or in dispersions of the polyurethanes in water depends mainly on the molecular weight and the hydrophilic character of the dissolved or dispersed particles, which in turn may be adjusted by suitable choice of the nature and quantitative proportions of the starting materials, particularly those used for the preparation of the isocyanate prepolymers, according to the known principles of polyurethane chemistry. An isocyanate prepolymer which has an average isocyanate functionality slightly below two, for example, causes the polyaddition reaction to stop before very high molecular weights are reached. The polyurethanes in aqueous dispersions or solutions prepared by the process according to the invention are equal in quality to the known polyurethanes prepared in organic solvents. Films produced from them have excellent mechanical strength and resistance to hydrolysis and may be used in various fields.

Because of the hydroxyl groups built into side-chains in the products according to the invention, the products can be cross-linked after they have been shaped, for example by evaporation of the solvent or water, after a cross-linking agent which can be activated chemically or by heat has been added to the solution or dispersion.

Suitable cross-linking agents include, for example, polyisocyanates which have blocked isocyanate groups or melamine resins which are reactive with hydroxyl groups. Even when the products obtained by the process according to the invention are not chemically cross-linked through their side-chain hydroxyl group, these hydroxyl groups may still be an advantage since they often increase the physical affinity of the products of the process for substrates coated with the compounds according to the invention.

All the parts given in the following examples are parts by weight.

EXAMPLES

Example 1

1237.5 parts of a polybutylene adipate (m.wt. 2250) and 191.3 parts of a four-times propoxylated adduct of 2-butenediol-(1,4) and sodium bisulphite (m.wt. 425), hereinafter referred to as "adduct", were dehydrated in a water jet vacuum at 120° C. 488.4 parts of 1-isocyanato-3-isocyanatomethyl-3,5,5-trimethylcyclohexane were added to this mixture at 70° C. and, after the temperature had been raised to 100° C., the mixture was stirred until the isocyanate content of the melt was 5.3%. After cooling to 60° C., 437.4 parts of a bisoxazolidine represented by the following formula

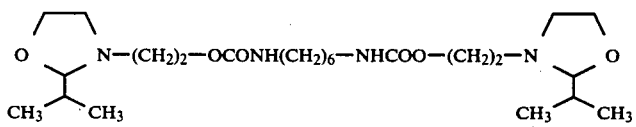

were stirred in and 5060 parts of deionized water were then added to the mixture with vigorous stirring. The aqueous dispersion obtained had a solids content of about 30% and a viscosity of 14 seconds (Ford cup 4 mm). It showed a Tyndall effect in transmitted light. The dispersion dried to form a clear, colorless and tack-free film which had the following mechanical properties:

Tensile strength: 37.2 MPa
Elongation at break: 620%

15 parts of a hexamethyl-butyloxymethylmelamine were added to 330 parts of the dispersion and the mixture was cast to form a film. After drying, the film was heated to 130° C. for 20 minutes. The mechanical properties measured on this film were as follows:

Tensile strength: 45.3 MPa
Elongation of break: 410%

The film did not become tacky when moistened with toluene and acetone and did not dissolve in hot DMF.

Example 2

361.8 parts of a bis-oxazolidine represented by the following formula

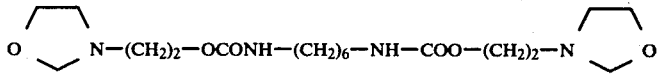

were added to the isocyanate prepolymer from Example 1 at 60° C. 5100 parts of deionized water were added with vigorous stirring. The resulting dispersion had a solids content of 30% and a viscosity of 18 seconds (Ford cup, 4 mm). It showed a Tyndall effect in transmitted light.

The dispersion dried to form a clear, colorless and tack-free film which had a shore-A hardness of 78 after complete removal of the water. After 20 minutes heating to 130° C., the hardness had risen to 85 (shore-A) and the film would only swell but not dissolve in hot DMF.

Example 3

600 parts of a polyethanediol phthalate (m.wt. 2000), 525 parts of a polyethanediol phthalate adipate (m.wt. 1750) and 170.4 parts of the adduct described in Example 1 were dehydrated in a water jet vacuum at 120° C. 285.6 parts of hexa-methylene diisocyanate were added to this mixture at 70° C. The mixture was raised to a temperature of 100° C. and then stirred until the isocyanate content of the melt was 4.8%. After cooling to 80° C., 209 parts of an oxazolidine represented by the following formula

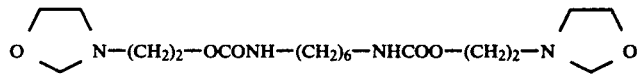

were stirred in and 4070 parts of deionized water were then added with vigorous stirring. The resulting aqueous dispersion had a solids content of 30% and a viscosity of 15 seconds (Ford cup, 4 mm). The dispersion showed a Tyndall effect in transmitted light. When cast, the dispersion dried to form a film which was clear and hard but could easily be scratched with a fingernail. The pencil hardness was HB-H. After 20 minutes heating at 130° C., it had risen to 3H.

Example 4

300 parts of a polyethanediol phthalate (m.wt. 2000), 612.5 parts of a polyethanediol phthalate adipate (m.wt. 1750), 13.4 parts of 1,1,1-tris-hydroxymethylpropane and 148.8 parts of the adduct described in Example 1 were dehydrated in a water jet vacuum at 120° C. 285.6 parts of hexamethylene diisocyanate were added to this mixture at 70° C., the temperature was raised to 100° C., and the mixture was then stirred until the isocyanate content of the melt was 4.3%. After cooling to 80° C., 252.7 parts of an oxazolidine represented by the following formula

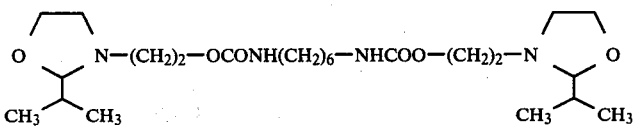

were stirred in and 2230 parts of deionized water were then added to the mixture with vigorous stirring. An aqueous dispersion having a solids content of 40% and a viscosity of 20 seconds (Ford cup, 4 mm) was obtained. The dispersion showed a Tyndall effect in transmitted light.

Example 5

1000 parts of an ethanediol/butanediol-(1,4)/diethyleneglycol polyadipate (m.wt. 2000) and 1100 parts of an adduct of stoichiometric quantities of (i) a polyether alcohol of 83% of ethylene oxide and 17% of propylene oxide (m.wt. 1900) which had been started on n-butanol, (ii) hexamethylene diisocyanate and (iii) diethanolamine were dehydrated in a water jet vacuum at 120° C. To this mixture were added 369.2 parts of hexamethylene diisocyanate and, after the temperature had been raised to 100° C., the mixture was stirred until the isocyanate content of the melt was 4.1%. After cooling to 30° C., 358.2 parts of an oxazolidine represented by the following formula

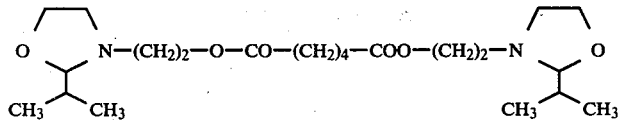

were stirred in and 6160 parts of deionized water were then added to the mixture with vigorous stirring. The resulting dispersion had a solids content of 30%. It showed a Tyndall effect in transmitted light.

Example 6

1192.5 parts of a polybutanediol adipate (m.wt. 2250), 137.5 parts of a propylene oxide polyether (m.wt. 550) which had been started on bisphenol A, 85.5 parts of a polyether alcohol of 85% ethylene oxide and 15% propylene oxide which had been started on n-butanol and 85.2 parts of the adduct described in Example 1 were dehydrated in a water jet vacuum at 120° C. To this mixture were added 488.4 parts of 1-isocyanato-3-isocyanatomethyl-3,5,5-trimethyl-cyclohexane at 70° C. and, after the temperature had been raised to 100° C., the mixture was stirred until the isocyanate content was 5.0%. After cooling to 60° C., 437.4 parts of a bis-oxazolidine represented by the following formula

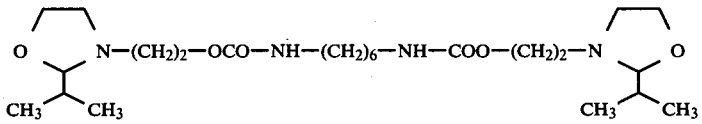

were stirred in and 3320 parts of a deionized water were then added to the mixture with vigorous stirring. The resulting dispersion had a solids content of 40% and a viscosity of 18 seconds (Ford cup, 4 mm). It showed a Tyndall effect in transmitted light. The dispersion dried to form a clear, colorless and elastic film which had the following mechanical properties:
Tensile strength: 28.6 MPa
Elongation at break: 930%

250 parts of the dispersion were mixed with 20 parts of a triisocyanatohexylbiuret which was masked with butanone. When a film prepared from it had dried, it was heated to 160° C. for 30 minutes. The mechanical properties determined on this film were as follows:
Tensile strength: 41.7 MPa
Elongation at break: 430%

Example 7

500 parts of a polyethylene phthalate (m.wt. 2000), 332 parts of a polypropylene glycolether (m.wt. 550) which had been started on bisphenol A, 13.4 parts of tris-hydroxymethyl-propane and 104 parts of the adduct described in Example 1 were dehydrated in a water jet vacuum at 120° C. 320 parts of hexanediisocyanate were added to this mixture at 70° C. and, after the temperature had been raised to 100° C., the mixture was stirred till the isocyanate content was 4.7%. After cooling to 40° C., 246 parts of an oxazolidine represented by the following formula

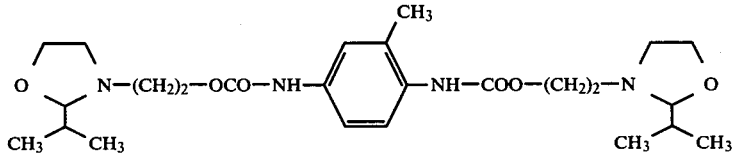

were stirred in and a mixture of 2260 parts of deionized water and 76 parts of ethyleneglycol monoethylester were then added with vigorous stirring. A dispersion having a solids content of 40% was obtained. It showed a Tyndall effect in transmitted light.

Example 8

552 parts of a polypropylene glycol ether (m.wt. 550) which had been started on bisphenol A were dehydrated in a water jet vacuum at 120° C. and mixed with 320 parts of hexane diisocyanate at 70° C. After the temperature had been raised to 100° C., the mixture was stirred until the isocyanate content was 8.7%. It was then cooled to 50° C. and 238 parts of an adduct of 20 mol of ethyleneoxide and 1 mol of isononyl phenol were dissolved in it. After the addition of 320 parts of an oxazolidine represented by the following formula

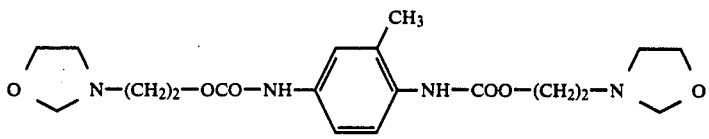

and 84 parts of ethyleneglycol monoethyl ether, 2500 parts of deionized water were added with vigorous stirring. A dispersion having a solids content of 38% was obtained. It showed a Tyndall effect in transmitted light. It was cast and dried to form a clear, tough film of great hardness.

Example 9

556 parts of a polypropyleneglycol ether (m.wt. 550) which had been started on bisphenol A and 93.6 parts of the adduct described in Example 1 were dehydrated in a water jet vacuum at 120° C. 320 parts of hexanediisocyanate were added to this mixture at 70° C. and, after the temperature had been raised to 100° C., the mixture was stirred until the isocyanate content was 6.3%. 80 parts of an oxazolidine represented by the following formula

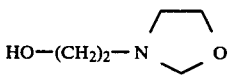

were then added and the mixture was stirred for 12 hours at 70° C. 105 parts of ethylene glycol monoethylether were then added and 1590 parts of deionized water were stirred in at 50° C. The resulting dispersion had a solids content of 40% and showed a Tyndall effect in transmitted light. It dried to form a clear, tough and glossy film.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of substantially linear isocyanate polyaddition products containing hydroxyl groups derived from oxazolidine groups in sidechains by the reaction of reactive systems which contain free isocyanate groups and oxazolidine groups with water, characterized in that
    (a) substantially linear prepolymers which have both isocyanate end groups and oxazolidine end groups or
    (b) a mixture containing substantially linear isocyanate prepolymers and bis-oxazolidines are chain lengthened by mixing with water, using a quantity of water calculated to provide at least about 1 mol of water per mol of oxazolidine groups present in the reaction mixture.

2. A process according to claim 1, characterized in that the prepolymers used are hydrophilically modified and/or contain an external emulsifier and water is used in a large excess in the chain-lengthening reaction so that the polyaddition products are directly obtained as an aqueous dispersion or solution.

3. Isocyanate polyaddition products containing hydroxyl groups derived from oxazolidine groups in sidechains obtainable according to the process of claim 1.

4. A process for the production of substantially linear isocyanate polyaddition products containing pendant hydroxyl groups derived from oxazolidine groups comprising reacting
    A. a reactive system selected from the group consisting of
        i. a mixture comprising
            a. bis-oxazolidines and
            b. a substantially linear, isocyanate prepolymer having
                (1) an average isocyanate functionality of from about 1.8 to 2.2,
                (2) an average molecular weight of from about 500 to 10,000, and
                (3) dispersing centers selected from the group consisting of chemically incorporated cationic or anionic groups present in said isocyanate prepolymer in from about 0 to 100 milliequivalents per 100 g of isocyanate prepolymer, chemically incorporated ethylene oxide units present in said isocyanate present in from about 0 to 30% by weight, based on the weight of the isocyanate prepolymer, and external emulsifiers present in about 0 to 30% by weight, based on the weight of the isocyanate prepolymer, and
        ii. the substantially linear, isocyanate prepolymer of (ib) above which in addition contains oxazolidine groups,
        said reactive system containing from about 0.6 to 1.1 mols of oxazolidine groups per mol of isocyanate groups, with
    B. water,
    wherein the water is present in the process in a sufficient amount to provide at least about 1 mol of water per mol of oxazolidine groups present in the reactive system.

5. The process of claim 4 wherein isocyanate prepolymer (ib) has
    (1) an average isocyanate functionality of from about 1.8 to 2.2,
    (2) an average molecular weight of from about 500 to 10,000, and
    (3) dispersing centers selected from the group consisting of chemically incorporated cationic or anionic groups present in said isocyanate prepolymer in from about 0.1 to 100 milliequivalents per 100 g. of isocyanate prepolymer, chemically incorporated ethylene oxide units present in said isocyanate present in from about 0.5 to 30% by weight, based on the weight of the isocyanate prepolymer, and external emulsifiers present in about 1 to 30% by weight, based on the weight of the isocyanate prepolymer.

6. The process of claim 5 wherein the substantially linear hydrophilic isocyanate prepolymers are prepared using a ratio of isocyanate groups to isocyanate-reactive hydrogen atoms of from about 1.05:1 to 10:1.

7. The process of claim 5 wherein the substantially linear, hydrophilic isocyanate prepolymers are prepared solvent-free.

8. The process of claim 4 wherein the oxazolidine groups of the isocyanate prepolymers and bis-oxazolidines are represented by the structural formula

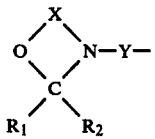

wherein $R_1$ and $R_2$, which may be the same or different, represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms, or $R_1$ and $R_2$ together with the ring carbon atom may form a 5-membered or 6-membered cycloaliphatic hydrocarbon ring, X represents a group represented by the following formula:

in which $R_3$ and $R_4$ which may be the same or different, represent hydrogen or $C_1$–$C_4$ alkyl groups, and m represents 2 or 3, Y represents a group represented by the following formula:

in which $R_3$ and $R_4$ have the meanings indicated above and n represents an integer of from 2 to 6.

9. The process of claim 4 wherein the water is present in the process in at least about 2 mols of water per mol of oxazolidine groups present in the reactive system.

10. Isocyanate polyaddition products containing pendant hydroxyl groups derived from oxazolidine groups produced by the processes of claims 4 or 5.

* * * * *